(12) United States Patent
Abbasfar

(10) Patent No.: US 8,443,223 B2
(45) Date of Patent: May 14, 2013

(54) METHOD AND SYSTEM FOR BALANCING RECEIVE-SIDE SUPPLY LOAD

(75) Inventor: Aliazam Abbasfar, Campbell, CA (US)

(73) Assignee: Rambus Inc., Sunnyvale, CA (US)

( * ) Notice: Subject to any disclaimer, the term of this patent is extended or adjusted under 35 U.S.C. 154(b) by 293 days.

(21) Appl. No.: 12/922,947

(22) PCT Filed: Jul. 7, 2009

(86) PCT No.: PCT/US2009/049813
§ 371 (c)(1),
(2), (4) Date: Sep. 16, 2010

(87) PCT Pub. No.: WO2010/014358
PCT Pub. Date: Feb. 4, 2010

(65) Prior Publication Data
US 2011/0029801 A1 Feb. 3, 2011

Related U.S. Application Data

(60) Provisional application No. 61/083,943, filed on Jul. 27, 2008.

(51) Int. Cl.
*H03K 17/082* (2006.01)

(52) U.S. Cl.
USPC ............................ 713/340; 326/26; 326/30

(58) Field of Classification Search ............ 713/340
See application file for complete search history.

(56) References Cited

U.S. PATENT DOCUMENTS

| | | | | |
|---|---|---|---|---|
| 5,548,241 A | * | 8/1996 | McClure | 327/538 |
| 5,581,209 A | * | 12/1996 | McClure | 327/538 |
| 5,589,794 A | * | 12/1996 | McClure | 327/538 |
| 5,874,833 A | * | 2/1999 | Perry et al. | 326/26 |
| 5,917,364 A | | 6/1999 | Nakamura | |
| 6,421,297 B1 | | 7/2002 | Huber | |
| 6,501,401 B2 | | 12/2002 | Van Den Boom et al. | |
| 6,747,583 B2 | * | 6/2004 | Tucholski et al. | 341/118 |
| 7,003,605 B2 | * | 2/2006 | Craft et al. | 710/106 |

(Continued)

FOREIGN PATENT DOCUMENTS

WO  WO 2004105334 A2 * 12/2004

OTHER PUBLICATIONS

Search Report and Written Opinion with mail date of Feb. 1, 2010, regarding International Application No. PCT/US2009/049813. 12 pages.

(Continued)

*Primary Examiner* — Ryan Stiglic

(74) *Attorney, Agent, or Firm* — Silicon Edge Law Group LLP; Arthur J. Behiel

(57) ABSTRACT

Described are digital communication systems that transmit and receive parallel sets of data symbols. Differences between successive sets of symbols induce changes in the current used to express the symbol sets, and thus introduce supply ripple. A receiver adds compensation current to reduce supply ripple. The compensation current is calculated based upon prior data samples rather than the current symbols, and consequently increases the maximum instantaneous current fluctuations between adjacent symbol sets as compared with circuits that do not include the compensation. The frequency response of the power-distribution network filters out the increased data dependence of the local supply current, however, and consequently reduces the fluctuations of total supply current. Some embodiments provide compensation currents for both transmitted and received symbols.

27 Claims, 4 Drawing Sheets

U.S. PATENT DOCUMENTS

| | | | |
|---|---|---|---|
| 7,106,099 B1* | 9/2006 | Nix | 326/40 |
| 8,010,859 B2* | 8/2011 | Lee | 714/748 |
| 8,234,532 B2* | 7/2012 | Lee | 714/748 |
| 2004/0062073 A1 | 4/2004 | Camacho et al. | |
| 2006/0227912 A1* | 10/2006 | Leibowitz et al. | 375/350 |
| 2007/0046331 A1 | 3/2007 | Kwon et al. | |
| 2008/0022179 A1* | 1/2008 | Lee | 714/748 |
| 2008/0162766 A1* | 7/2008 | Fanning et al. | 710/305 |
| 2009/0285277 A1* | 11/2009 | Sunaga et al. | 375/233 |
| 2011/0234257 A1* | 9/2011 | Kwon et al. | 326/26 |
| 2011/0314349 A1* | 12/2011 | Lee | 714/748 |
| 2012/0140812 A1* | 6/2012 | Ho et al. | 375/233 |

OTHER PUBLICATIONS

Alon, Elad et al. "Replica Compensated Linear Regulators for Supply-Regulated Phase-Locked Loops." IEEE Journal of Solid-State Circuits, vol. 41, No. 2. Feb. 2006. pp. 413-424.

* cited by examiner

METHOD AND SYSTEM FOR BALANCING RECEIVE-SIDE SUPPLY LOAD

FIELD

The invention relates to the suppression of power-supply noise in integrated circuits.

BACKGROUND

Transmitters and receivers in typical high-speed digital communication systems convey information as series of symbols. Common binary systems express a logic one symbol value by drawing a first current from a supply-voltage node through a load to produce a voltage representative of a logic one, and a logic zero symbol value by drawing a second current through the load to produce a voltage representative of a logic zero. A receiver then samples the symbols against a reference voltage to recover the original information. When data symbols are conveyed in parallel as sets of symbols, the total current used to represent successive sets of symbols can change dramatically from one signal to the next. The supply current can thus be data dependent.

Power supplies are imperfect. For example, the lines and pads used to convey supply current exhibit parasitic resistive, inductive, and capacitive impedances. Unfortunately, these impedances and the data-dependent supply current together cause the supply voltage to fluctuate, which can introduce errors and reduce speed performance. This problem is referred to by those of skill in the art as simultaneous switching noise, or SSN. Efforts to minimize SSN have focused on improved voltage regulation and reduced supply impedance so the supply better tolerates changes in load current, and the use of balanced symbols patterns or compensation currents to minimize such changes. These efforts have met with considerable success, but there is ever a demand for improved performance.

BRIEF DESCRIPTION OF THE DRAWINGS

The subject matter disclosed is illustrated by way of example, and not by way of limitation, in the figures of the accompanying drawings and in which like reference numerals refer to similar elements and in which.

DETAILED DESCRIPTION

Figure 1:
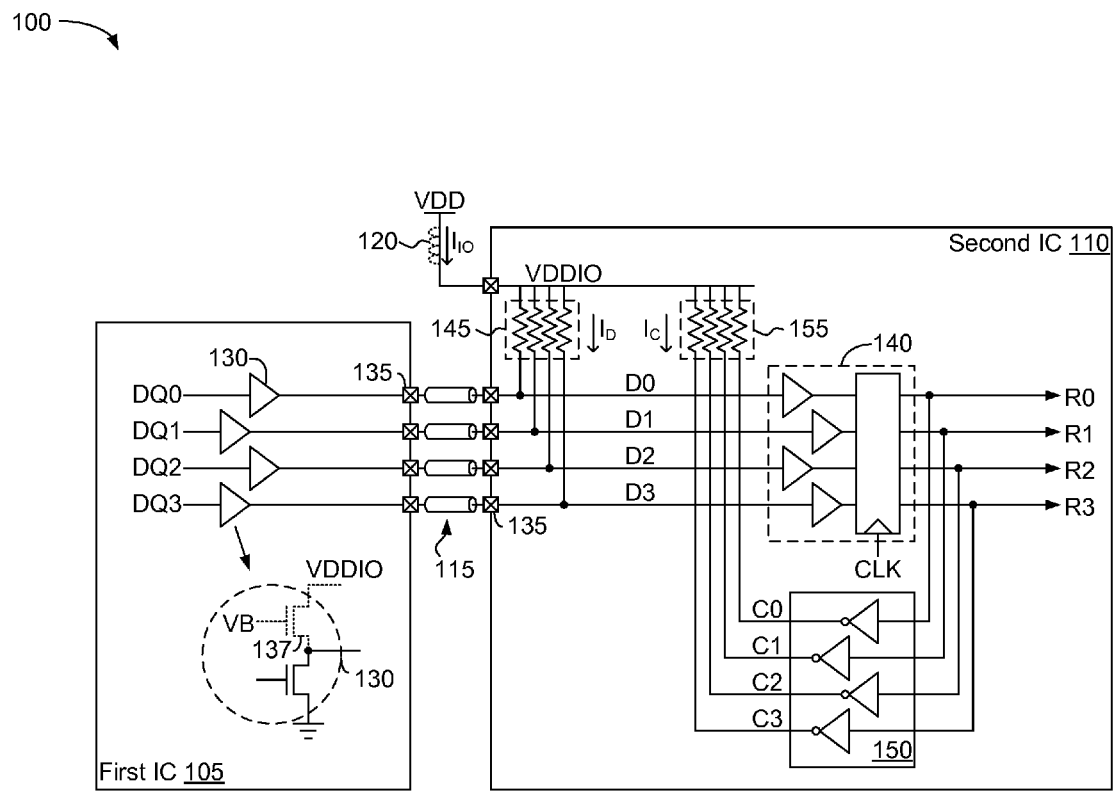
FIG. 1 depicts a synchronous, digital communication system 100 in which a first integrated circuit (IC) 105 transmits data DQ[3:0] to a second IC 110 over a parallel data channel 115.

FIG. 1 depicts a synchronous, digital communication system 100 in which a first integrated circuit (IC) 105 transmits data DQ[3:0] to a second IC 110 over a parallel data channel 115. Differences between successive sets of symbols (e.g., 0000 to 1111) induce changes in a data current $I_D$ used to express data symbols D[3:0] on like-named data nodes of IC 110, each of which corresponds to one bit line of channel 115. IC 110, the receiver in this example, adds a compensation current $I_C$ to data current $I_D$. The compensation current is calculated based upon prior received samples R[3:0] rather than the current symbols D[3:0], and consequently increases the maximum instantaneous current fluctuation between adjacent symbol sets as compared with circuits that do not include the compensation. Otherwise stated, second IC 110 increases the data dependence of the supply current from internal node VDDIO in a given time interval. However, the frequency response of the power-distribution network (PDN) filters out much of the increased data dependence of the local supply current ($I_D+I_C$), and consequently reduces the fluctuations of total input/output (I/O) supply current $I_{IO}$. The reduced I/O current fluctuations stabilize supply voltages VDD and VDDIO, and thus improve the performance of IC 110. The frequency response of the PDN is largely a function of parasitic lead inductance 120 external to IC 110, but is also a function of e.g. bypass capacitors and parasitic resistance and capacitance (not shown).

First IC 105 includes four drivers 130 in this simple example, each of which drives one of data signals DQ[3:0] onto a link of channel 115 via a respective pad 135. Each driver 130 may be a pull-down driver in which an NMOS transistor pulls its respective pad 135 toward ground potential to express a logic one and turns off to express a logic zero. More generally, each driver 130 draws a first, non-zero current from supply node VDDIO to represent a logic one and a second, substantially zero current to represent a logic zero. Each driver 130 may include a local pull-up device, such as a pull-up transistor 137 having a gate bias VB, such that driver 130 can sink and source current to represent alternative logic values. Other embodiments use different numbers and types of drivers, and can use different types of internal (on-die) or external termination elements.

Second IC 110 receives data symbols D[3:0] on respective pads 135 and conveys them to the input nodes of a sampler 140. Drivers 130 pull current through termination resistors 145 to express logic ones and allows resistors 145 to pull pads 135 toward supply voltage VDDIO to express logic zeros. Sampler 140 samples symbols D[3:0] on edges of a clock signal CLK to provide parallel received samples R[3:0] on respective sampler output terminals.

Symbols D[3:0] are encoded such that successive symbol sets may include different numbers of ones and zeros (the code is unbalanced). The data current $I_D$ used to express a given set of symbols D[3:0], the sum of the currents from each symbol in the set, ranges from a minimum when each of drivers 130 is off (D[3:0]=0000) to a maximum when each of drivers 130 is on (D[3:0]=1111). Switching between symbols sets with different numbers of ones and zeroes changes data current $I_D$ and introduces simultaneous-switching noise (SSN) in the supply voltage that adversely impacts system performance. Prior systems have reduced data-dependent supply current at the transmit side by providing a complementary compensation current to cancel the current fluctuations between symbols sets. Such systems generally do not work at the receiver, however, as the receiver does not know in advance the pattern to be received, and thus cannot provide a complementary compensation current for an incoming symbol pattern.

Second IC 110 includes a compensation circuit 150 that develops compensation signals C[3:0] and a resulting compensation current k based upon samples R[3:0] of prior received symbols. The resulting compensation current $I_C$ does not complement the current symbol set D[3:0], and in fact considerably increases the maximum current fluctuation between successive symbol sets. Applicant discovered, however, that the PDN can filter out the results of late application of compensation current, with the result being reduced SSN and improved system performance.

Figure 2:
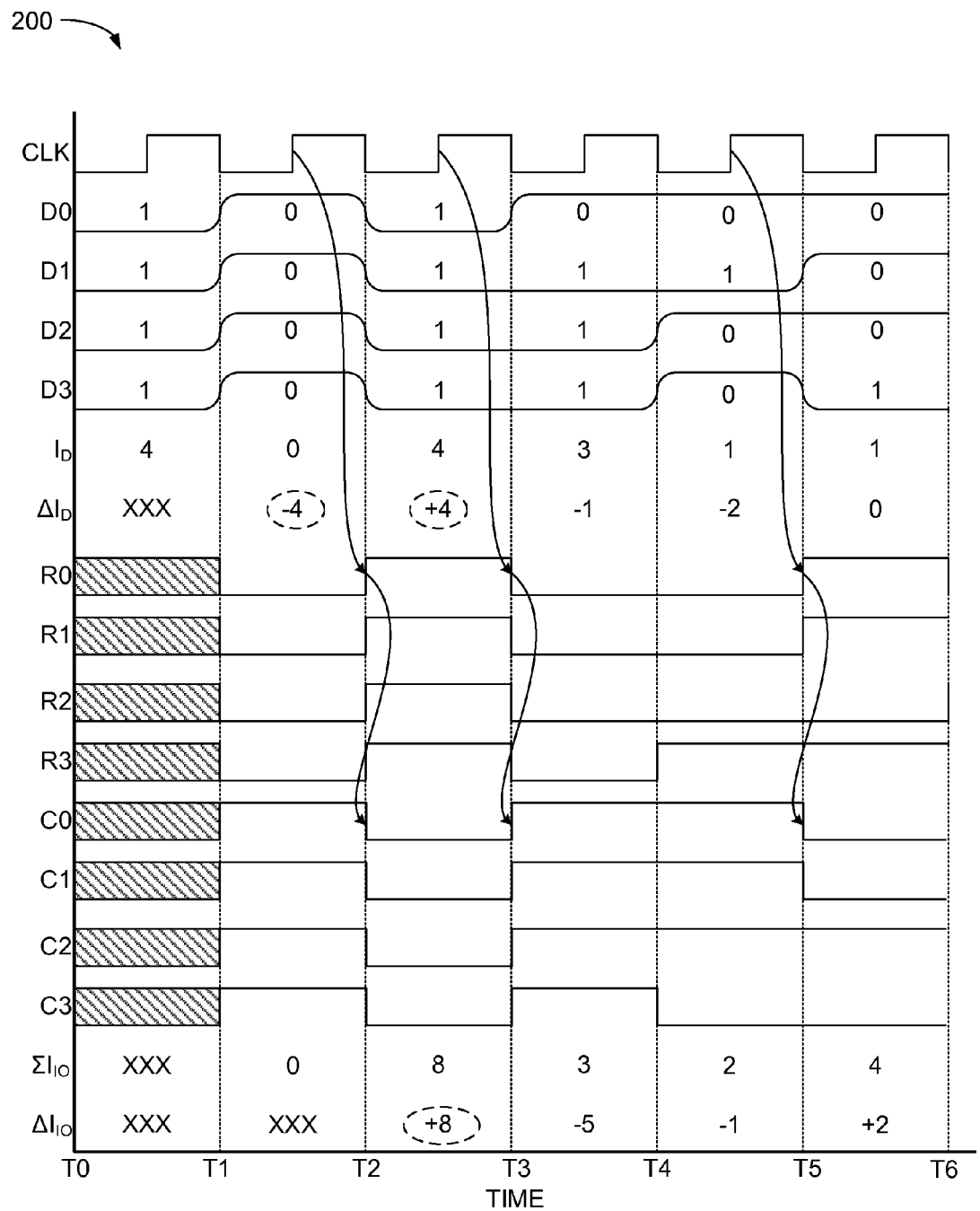
FIG. 2 is a waveform diagram 200 depicting the operation of system 100 of FIG. 1 in accordance with one embodiment.

FIG. 2 is a waveform diagram 200 depicting the operation of system 100 of FIG. 1 in accordance with one embodiment. The relative timing of the signals is an illustrative approximation, and is not to scale. Recalling that a logic value of one is represented by a relatively low voltage, the top four waveforms show received data symbols D[3:0] as representing a series of symbol sets 1111, 0000, 1111, 1110, 0010, and 1000 over six time intervals divided between seven symbol transition times T0-T6. The current used to express a logic-one value (low voltage level) is normalized to a one, so the sum of the currents used to express the four symbols can vary between zero and four depending upon the ratio of one and zero logic values expressed by data symbols D[3:0]. Changes between symbol sets D[3:0]=0000 and D[3:0]=1111 require the maximum number of symbol transitions, and thus result in the greatest change $\Delta I_D$ in data current $I_D$. The maximum current fluctuation occurs at times T1 and T2, at which instants the data-current change $\Delta I_D$ is negative and positive four, respectively. Fewer symbols transition at the remaining times T3-T6, so the data-current changes $\Delta I_D$ are lower in those instances.

With reference to FIG. 1, sampler 140 samples symbols D[3:0] on edges of clock signal CLK to produce the successive sets of samples R[3:0]. Returning to FIG. 2, samples R[3:0] express the same successive patterns as data symbols D[3:0] but are phase shifted due to the sample timing of clock signal CLK and delays inherent in e.g. sampler 140 and compensation circuit 150. Compensation circuit 150 inverts the sense of samples R[3:0] in this embodiment to produce compensation signals C[3:0] that are the complement of the preceding data symbols. From the perspective of a current symbol set D[3:0], compensation signals C[3:0] are the complement of a prior symbol set. The prior symbol set immediately precedes the compensation signals in this embodiment, but the delay may be less or more in other embodiments. Compensation circuit 150 is represented as a collection of four inverters and associated resistors, but other embodiments can use different numbers and types of drive circuits to support compensation. Some such embodiments are noted below in connection with FIG. 4.

The output nodes of compensation circuit 150 are coupled to internal supply node VDDIO via resistors 155, which may be identical to resistors 145. Resistors 155 may be integral with compensation circuit 150 (e.g., may be part of the output drivers illustrated here as inverters). Compensation signals C[3:0] collectively draw a compensation current $I_C$ that is the complement of the data current drawn by the preceding symbol set D[3:0] (as used herein, the term "complement" implies a ±20% tolerance for compensation currents). Because compensation signals C[3:0] are time shifted with respect to the incoming data symbols D[3:0], the sum of data current $I_D$ and compensation current $I_C$ (labeled $\Sigma I_{IO}$) can be greater than data current $I_D$ alone. For example, the total IO current $\Sigma I_{IO}$ between times T2 and T3 is eight, which is double the highest data current $I_D$. Compensation also dramatically increases the maximum change in current between symbol sets. For example, the sum of currents $\Sigma I_{IO}$ ($\Sigma I_{IO}=I_D+I_C$) transitions from zero to eight between the time intervals separated by time T2. This maximum change in I/O current $\Delta I_{IO}$ between symbols is double the worst-case change to data current $\Delta I_D$. The inclusion of compensation circuit 150 thus greatly increases data-dependent fluctuations in supply current.

Increasing data-dependent supply fluctuations is known to reduce performance. Applicant discovered, however, that if the data rates are sufficiently high relative to the frequency response of the PDN, the filtering effect of the PDN can dampen the data-dependent fluctuations. Despite the increased data-dependent supply fluctuations, the resulting filtered supply voltage VDDIO can exhibit less data-dependency than receivers that lack compensation.

Figure 3:
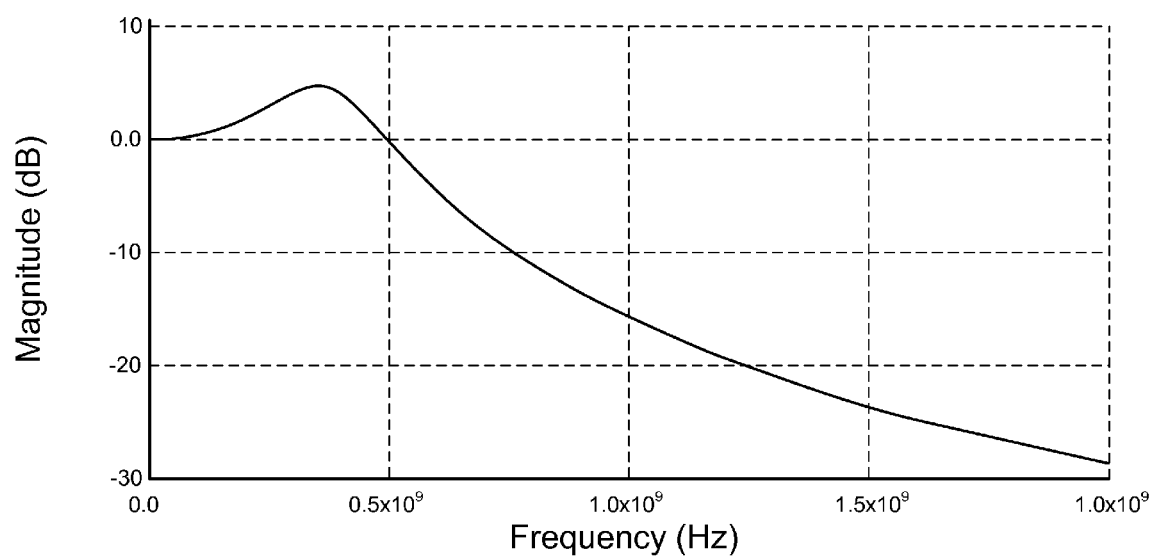
FIG. 3 plots the frequency response for a power-distribution network in accordance with an embodiment.

FIG. 3 plots the frequency response for a PDN in accordance with an embodiment. The following table simulates effect on supply noise VDDIO of applying compensation current $I_C$ at different delays relative to data symbols received at a 5 GHz data rate (i.e., the data period T is 200 psec). The value SSN0 represents the power of simultaneous-switching noise (SSN) without compensation, whereas the value SSN represents the power of simultaneous-switching noise with compensation. The ratio SSN0/SSN is a measure of merit for compensation current applied at different delays relative to the received symbol sets.

TABLE 1

| Delay (in T) | SSN0/SSN |
|---|---|
| 0.0 | Infinite |
| 0.5 | 70.4843 |
| 1.0 | 18.5204 |
| 1.5 | 8.3055 |
| 2.0 | 4.8437 |
| 2.5 | 3.2314 |
| 3.0 | 2.2328 |
| 3.5 | 1.7210 |

With reference to Table 1, if the compensation current can be applied coincident with the received data symbols (zero delay), then the simultaneous switching noise may be effectively eliminated (SSN=0). Compensation becomes progressively less effective with delay, but remains very beneficial if provided within a few periods. At one period, as in the example of FIGS. 1 and 2, the simultaneous switching noise is reduced by a factor of nearly twenty. At two periods, the factor is about five.

Providing feedback within one symbol time can be challenging, in part because circuits fast enough to apply feedback very quickly can consume considerable power and exacerbate the problem of supply noise. Even achieving a feedback delay of between one and two symbol times without undesirable power consumption and supply noise might be challenging. Delaying application of compensation feedback reduces these problems, but also reduces the effectiveness of the feedback. The delay may therefore be tuned for a given system to yield optimal results. As a practical matter, given the data in Table 1, delays of between about one and five symbols times are thought to be relatively easily and inexpensively implemented while preserving some of the advantages associated with application of the delayed compensation current.

Some embodiments may include compensation circuits with adjustable delays to accommodate testing or performance optimization for a given system or signaling environment. Delay adjustments can be done once, or may be repeated to account for changes in e.g. temperature and supply voltage. For example, the delay can be occasionally or periodically updated based upon a performance metric, such as supply noise, signal margin, or bit-error rate (BER).

Figure 4:
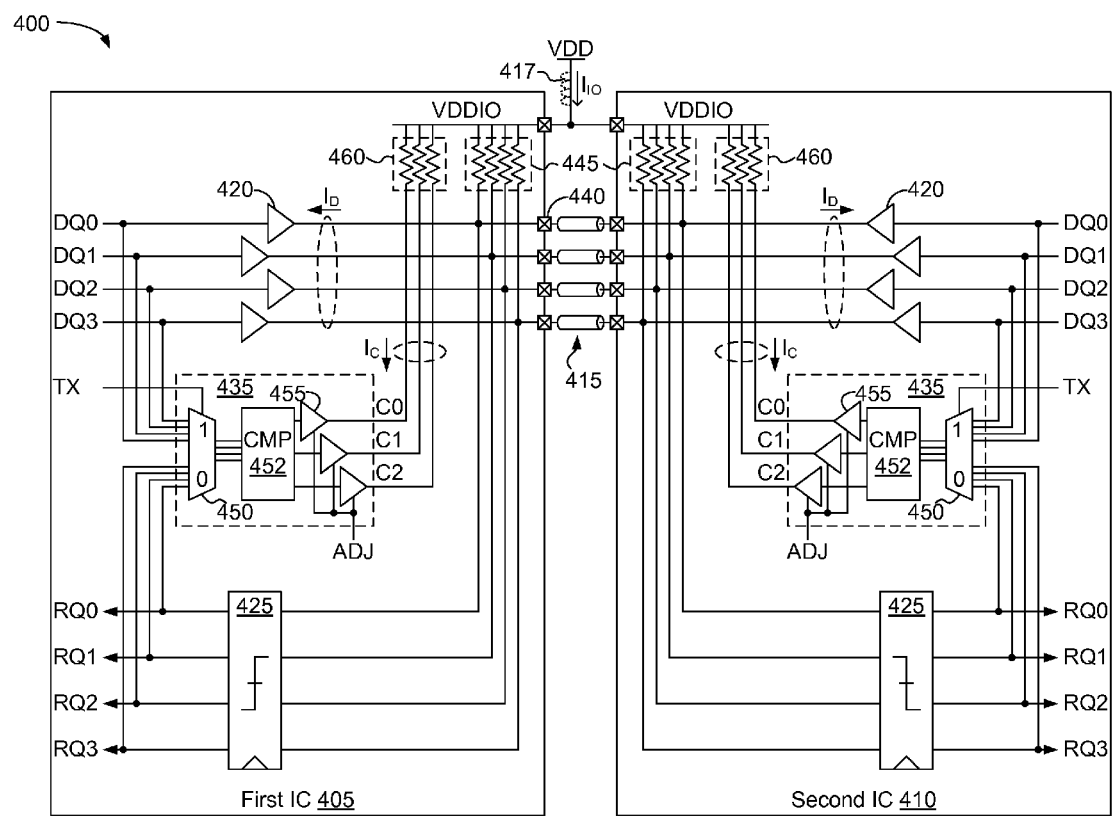
FIG. 4 depicts a system 400 in accordance with another embodiment. System 400 includes first and second ICs 405 and 410 that share an external supply voltage VDD and communicate via a parallel, bidirectional channel 415.

FIG. 4 depicts a system 400 in accordance with another embodiment. System 400 includes first and second ICs 405 and 410 that share an external supply voltage VDD and communicate via a parallel, bidirectional channel 415. ICs 405 and 410 are identical in this embodiment so a detailed discussion of IC 410 is omitted for brevity. The PDN of system 400 is represented by conductive traces that distribute supply voltage VDD to ICs 405 and 410 as local supply voltages VDDIO, and that exhibit some parasitic inductance 417.

IC 405 includes four drivers 420, a four-bit sampler 425, and a compensation circuit 435. The outputs of drivers 420 and the inputs of sampler 425 are coupled to I/O pads 440 and to supply node VDDIO via termination resistors 445, which can be internal or external to IC 405. Compensation circuit 435 includes a multiplexer 450, compensation logic 452, and three drivers 455. When a signal TX is asserted, which indicates that IC 405 is in a transmit mode, multiplexer 450 applies data inputs DQ[3:0] to the inputs of logic 452. Logic 452 derives the appropriate combination of compensation signals C[2:0] and applies them to resistors 460 via drivers 455.

The embodiment of FIG. 4 includes fewer compensation drivers 455 than data drivers 420. Some coding schemes limit the amount of drive-current switched between symbol sets by constraining the possible symbol patterns. Some forms of data-bus inversion (DBI), for example, express data on eight data lines and a bus-inversion line (8+1 lines). When the data to be expressed on the eight data lines includes more than four zeros, the data is inverted and the bus-inversion line asserted to note the inversion. Because the number of simultaneous zeros is limited to four, a compensation current complementary to the data current may be formed using only four compensation drivers.

Compensation drivers 455 apply compensation signals C[2:0] to resistors 460 to draw a compensation current $I_C$ from internal supply node VDDIO. Compensation current $I_C$ complements data current $I_D$ on IC 405, which flows to drivers 420 via termination resistors 445 on both sides of channel 415 in this embodiment. Compensation current $I_C$ is scaled to reduce or minimize the change in supply current $I_{IO}$ from one symbol set to the next. The delays through drivers 420 and compensation circuit 435 can be matched such that the timing of changes to the compensation current $I_C$ and the data current $I_D$ are simultaneous. Such matching may be optimal, but is not required for improved performance for the reasons noted previously in connection with the discussion of FIG. 3.

Transmit signal TX is not asserted in the receive mode. In that case, multiplexer 450 applies receive samples RQ[3:0] to the inputs to compensation logic 452. Compensation current $I_C$ complements data current $I_D$ on IC 410 associated with a prior received symbol set, which flows away from IC 405 to drivers 420 via termination resistors 445 on both sides of channel 415. Compensation circuit 435 functions as described in connection with prior embodiments, so a detailed treatment is omitted here for brevity.

Various characteristics of drivers 455 (e.g., propagation delay, drive strength, and/or impedance) can be adjusted by application of appropriate adjustment signals ADJ. For example, the drive strength of drivers 455 can be adjusted differently in the receive and transmit modes to scale the compensation current $I_C$ as appropriate for optimal performance in each mode. Other embodiments can employ different buffers for transmit and receive compensation, and unidirectional links can include transmit and receive compensation.

Both ICs 405 and 410 are similarly equipped with compensation circuitry in this example. In other embodiments, however, different sides of channel 415 may be differently equipped. In some systems, memory systems for example, the communicating ICs may have an asymmetry to them that complicates optimization of the transmit and receive schemes applied to counter the effects of SSN. For example, a memory controller that communicates with one or more memory devices may benefit from a fabrication technology that is different from that best suited for manufacturing the memory devices. It is therefore often the case that a memory controller can employ circuitry that exhibits significantly higher performance in speed and power than that of the associated memory device or devices. In such cases the memory controller might apply compensation for both transmitted and received data, whereas the memory device may omit compensation in either or both directions.

An output of a process for designing an integrated circuit, or a portion of an integrated circuit, comprising one or more of the circuits described herein may be a computer-readable medium such as, for example, a magnetic tape or an optical or magnetic disk. The computer-readable medium may be encoded with data structures or other information describing circuitry that may be physically instantiated as an integrated circuit or portion of an integrated circuit. Although various formats may be used for such encoding, these data structures are commonly written in Caltech Intermediate Format (CIF), Calma GDS II Stream Format (GDSII), or Electronic Design Interchange Format (EDIF). Those of skill in the art of integrated circuit design can develop such data structures from schematic diagrams of the type detailed above and the corresponding descriptions and encode the data structures on computer readable medium. Those of skill in the art of integrated circuit fabrication can use such encoded data to fabricate integrated circuits comprising one or more of the circuits described herein.

In the foregoing description and in the accompanying drawings, specific terminology and drawing symbols are set forth to provide a thorough understanding of the foregoing embodiments. In some instances, the terminology and symbols may imply specific details that are not required to practice the invention. For example, compensation circuits need not provide the compensation current in the manner depicted in FIGS. 1 and 4, as there are many ways to develop the appropriate compensation current available to those of skill in the art. Moreover, the systems detailed herein are binary and thus use two logic values, but other embodiments can similarly address SSN in multi-PAM systems. Furthermore, the term "system" may refer to a complete communication system, including a transmitter and a receiver, or may refer to portion of a communication system, such as a transmitter, a receiver, or an IC or other component that includes a transmitter and/or receiver. Still other embodiments will be evident to those of skill in the art.

Some components are shown directly connected to one another while others are shown connected via intermediate components. In each instance the method of interconnection, or "coupling," establishes some desired electrical communication between two or more circuit nodes (e.g., pads, lines, or terminals). Such coupling may often be accomplished using a number of circuit configurations, as will be understood by those of skill in the art. Therefore, the spirit and scope of the appended claims should not be limited to the foregoing description. Where U.S. laws apply, only those claims specifically reciting "means for" or "step for" should be construed in the manner required under the sixth paragraph of 35 U.S.C. §112.

What is claimed is:

1. A system comprising:
a power-supply connection to provide a supply voltage;
data connections to receive a prior set of parallel data symbols during a prior time interval and, on the same data connections, a current set of parallel data symbols during a current time interval subsequent the prior time interval; and a compensation circuit to receive the prior and current sets of parallel data symbols, the compensation circuit to draw a compensation current derived from the prior set of parallel data symbols from the power-supply connection during the current time interval.

2. The system of claim 1, wherein the compensation circuit is coupled to the data connections via a sampler having a clock node to receive a clock signal, wherein the clock signal defines the time intervals.

3. The system of claim 1, wherein the prior set of parallel data symbols draws a first supply current in the prior time interval, the current set of parallel data symbols draws a second supply current during the current time interval, and the maximum difference between the first and second supply currents is less than the maximum sum of the second supply current and the compensation current.

4. The system of claim 1, wherein the prior time interval is immediately adjacent the current time interval.

5. The system of claim 1, further comprising a transmitter having a plurality of transmitter input paths and a plurality of transmitter output paths coupled to the data connections.

6. The system of claim 5, wherein the compensation circuit is coupled to the transmitter input paths.

7. The system of claim 1 instantiated on an integrated circuit device.

8. The system of claim 1, the compensation circuit to adjust the timing of the drawing of the compensation current after receipt of the prior set of data symbols.

9. A method comprising:
receiving on a common set of data connections parallel sets of symbols, including a prior set of symbols during a prior time interval and a current set of symbols during a current time interval subsequent the prior time interval, the prior and current sets of symbols respectively drawing a prior supply current and a present supply current from a power-supply;
deriving a compensation current complementary to the prior supply current; and
drawing the compensation current from the power-supply during the current time interval.

10. The method of claim 9, wherein a clock signal defines the time intervals.

11. The method of claim 9, wherein a maximum sum of the compensation current and the present supply current exceeds a maximum difference between the prior and present supply currents.

12. The method of claim 11, wherein the prior time interval is immediately adjacent the current time interval.

13. The method of claim 9, the method further comprising transmitting successive sets of parallel data symbols on the data connections.

14. The method of claim 13, further comprising drawing a respective compensation current from the power-supply for each successive set of transmitted parallel data symbols.

15. The method of claim 14, wherein the respective compensation current is derived from a contemporaneous one of the successive sets of transmitted parallel data symbols.

16. A system comprising:
a supply to provide a supply voltage;
data paths coupled to the supply to receive sets of parallel data symbols, including a current set of data symbols drawing a current supply current in a current time interval and a prior set of data symbols drawing a prior supply current in a prior time interval; and
a compensation circuit to draw from the supply a compensation current complementary to the prior supply current during the current time interval.

17. The system of claim 16, wherein a maximum difference between the prior supply current and the current supply current is less than a maximum sum of the compensation current and the current supply current.

18. The system of claim 17, wherein the prior time interval is immediately adjacent the current time interval.

19. The system of claim 16 implemented on an integrated circuit.

20. The system of claim 16, further comprising a transmitter to transmit second sets of parallel data symbols on the data paths, wherein the compensation circuit derives a second compensation current for the second sets of parallel symbols and draws the second compensation current from the supply.

21. A non-transitory computer-readable medium having stored thereon a data structure defining at least a portion of an integrated circuit, the data structure comprising:
first data representing a supply node to provide a supply voltage;
second data representing data paths coupled to the supply node to receive successive sets of parallel data symbols in successive time intervals, including a current set of data symbols drawing a current supply current in a current time interval and a prior set of data symbols over the same data paths drawing a prior supply current in a prior time interval; and
third data representing a compensation circuit coupled to the data paths and the supply node, the compensation circuit to draw from the supply node a compensation current complementary to the prior supply current during the current time interval.

22. A system comprising:
a power-supply to provide a supply voltage;
data paths to receive a prior set of parallel data symbols and, on the same data paths, a current set of parallel data symbols in respective prior and current time intervals; and
means for deriving a compensation current from the prior set of parallel data symbols and drawing the compensation current from the power-supply during the current time interval.

23. A system comprising:
a supply;
a parallel bus to convey successive sets of parallel symbols, including a current symbol set in a current time interval and a prior symbol set in a prior time interval;
a sampler coupled to the parallel bus to sample the successive sets of parallel symbols to provide successive sets of received samples; and
a current draw mechanism coupled to the supply, the current draw mechanism drawing from the supply in the current time interval a current compensation current derived in association with the prior symbol set.

24. The system of claim 23 instantiated on an integrated circuit device.

25. The system of claim 23, wherein the current draw mechanism derives the current compensation current from at least one of the sets of received samples.

26. The system of claim 23, wherein each of the successive sets of parallel data symbols draws a data current from the supply, and wherein the compensation current in the current time interval is complementary to the data current in the prior time interval.

27. The system of claim 23, wherein the current time interval is adjacent the prior time interval.

* * * * *